United States Patent [19]

De Filippo

[11] Patent Number: 5,409,297
[45] Date of Patent: Apr. 25, 1995

[54] ARM REST FOR MOTOR VEHICLE REAR SEATS

[75] Inventor: Emilio De Filippo, Bruzolo, Italy

[73] Assignee: Gestind-M.B. "Manifattura di Bruzolo" S.p.A., Bruzolo, Italy

[21] Appl. No.: 50,805

[22] Filed: Apr. 21, 1993

[30] Foreign Application Priority Data

Jan. 21, 1993 [EP] European Pat. Off. ............ 93830017

[51] Int. Cl.⁶ .......................... B60N 2/46; A47C 7/54
[52] U.S. Cl. ......................... 297/411.32; 297/411.38; 297/113; 403/93; 16/32; 16/34
[58] Field of Search ....................... 297/411.32, 411.38, 297/113, 115; 403/93, 94; 16/32, 34

[56] References Cited

U.S. PATENT DOCUMENTS

| 1,150,277 | 8/1915 | Lee | 403/93 |
| 1,802,620 | 4/1931 | Scully | 297/411.32 |
| 3,583,734 | 6/1971 | Magi | 16/332 |
| 3,811,715 | 5/1974 | Brudy | 403/93 |
| 3,909,063 | 9/1975 | Bonisch | 297/411.32 |
| 4,230,414 | 10/1980 | Cheshire | 297/411.32 |
| 4,496,190 | 1/1985 | Barley | 297/411.32 |
| 4,586,750 | 5/1986 | Vogel | 297/411.32 |
| 5,190,390 | 3/1993 | Ming-Tai | 403/93 |

FOREIGN PATENT DOCUMENTS

| 0220579 | 5/1987 | European Pat. Off. | 16/334 |
| 1146324 | 5/1957 | France | 403/93 |
| 1203451 | 1/1960 | France | 16/334 |
| 1250349 | 11/1960 | France | 16/334 |
| 201166 | 3/1939 | Switzerland | 16/334 |

Primary Examiner—Kenneth J. Dorner
Assistant Examiner—David E. Allred
Attorney, Agent, or Firm—Sughrue, Mion, Zinn, Macpeak & Seas

[57] ABSTRACT

An arm rest (1) for motor vehicle rear seats, comprising an elongated body (2) and a load bearing structure (4) having a tubular end portion (5) swingably supported on a shaft (7) adapted to be fixed in a stationary condition to the lateral sides (F) of a recess (R) of the seat (S) backrest (B). The shaft (7) incorporates rotational friction members (15, 16) cooperating with the tubular end portion (5) of the load bearing structure (4).

9 Claims, 5 Drawing Sheets

ARM REST FOR MOTOR VEHICLE REAR SEATS

BACKGROUND OF THE INVENTION

The present invention refers in general to arm rests for motor vehicle seats, and is more particularly concerned with an arm rest adapted to be applied to a rear seat having a seating portion and a backrest formed with a central recess in correspondence of which the arm rest is susceptible to be swingably mounted between a raised inoperative position, in which same is received within such a recess and is flush with the backrest surface, and a lowered operative position in which it extends substantially horizontally above the seating portion of the seat.

Known are in the art arm rests for motor vehicle rear seats comprising an elongated body and a load bearing structure incorporated in the body and including swinging mounting means of the arm rest in correspondence of the said recess of the seat backrest, wherein said mounting means comprise a tubular end portion of the load bearing structure which is oriented transverse to the body, and a shaft coaxially inserted through the said tubular end portion and having respective ends protruding from opposite sides of the body for its connection in a stationary condition to the seat backrest so as to allow pivoting of the said tubular end on the said shaft between the raised position and the lowered position of the arm rest.

SUMMARY OF THE INVENTION

The primary object of the present invention is to provide an improved arm rest of the above-mentioned type.

A further object of the invention is providing an arm rest of the above-referenced type which, in use, is free from the risk of sudden and unintentional displacements from the raised position towards the lowered position.

Still a further object of the invention is to provide an arm rest having a reliable and safe operation and adapted to be manufactured in a relatively simple and cheap way.

According to the invention, the above objects are achieved by virtue of an arm rest for motor vehicle rear seats of the type defined at the beginning, mainly characterized in that the said shaft incorporates rotational friction means cooperating with the said tubular end portion of the load bearing structure and constituted by outer axial elements radially movable with respect to the shaft, and by associated elastically deformable inner members acting so as to radially urge the said axial elements into pressure contact against the said tubular end portion of the load bearing structure.

According to a preferred embodiment of the invention, the shaft is formed with a pair of cavities each of which is comprised between a respective end of the shaft and a central portion thereof, each cavity housing a median longitudinal member of elastomeric material on which a pair of the said radially movable elements rest in an opposed condition.

According to another feature of the invention, the said tubular end portion of the load bearing structure is formed with inner positioning projections against which the said radially movable elements of the shaft abut at least in the lowered position of the arm rest, and the disposition is such that the arm rest is allowed to perform a further frictioned lowering travel beyond the said lowered position, in case a load of an amount higher than a predetermined value is applied thereon, due to the said movable elements passing over the said positioning inner projections against the action of the said elastically deformable members.

In an alternative embodiment, the central portion of the shaft and the tubular end portion of the load bearing structure can be provided with respectively outer and inner complementary stop projections in order for limiting the angular travel of the arm rest between the said raised and lowered positions.

In this case disengageable retaining means are conveniently further provided, cooperating with at least one of the said outer stop projections of the shaft to lock the arm rest in the raised position.

BRIEF DESCRIPTION OF THE DRAWINGS

Additional features of the invention will become apparent in the following detailed description, with reference to the annexed drawings provided by way of pure non limiting example, wherein:

FIG. 3A is a view analogous to FIG. 3 in a first different position of the arm rest, FIG. 3B is a view analogous to FIG. 3 in a second different position of the arm rest, FIG. 4 a view analogous to FIG. 1, but in an enlarged scale, showing another embodiment of the arm rest, FIG. 5 a cross sectional and enlarged view along line V—V of FIG. 4 and FIG. 6 sectional view along line VI—VI of FIG. 5.

DETAILED DESCRIPTION OF THE INVENTION

Figure 1:
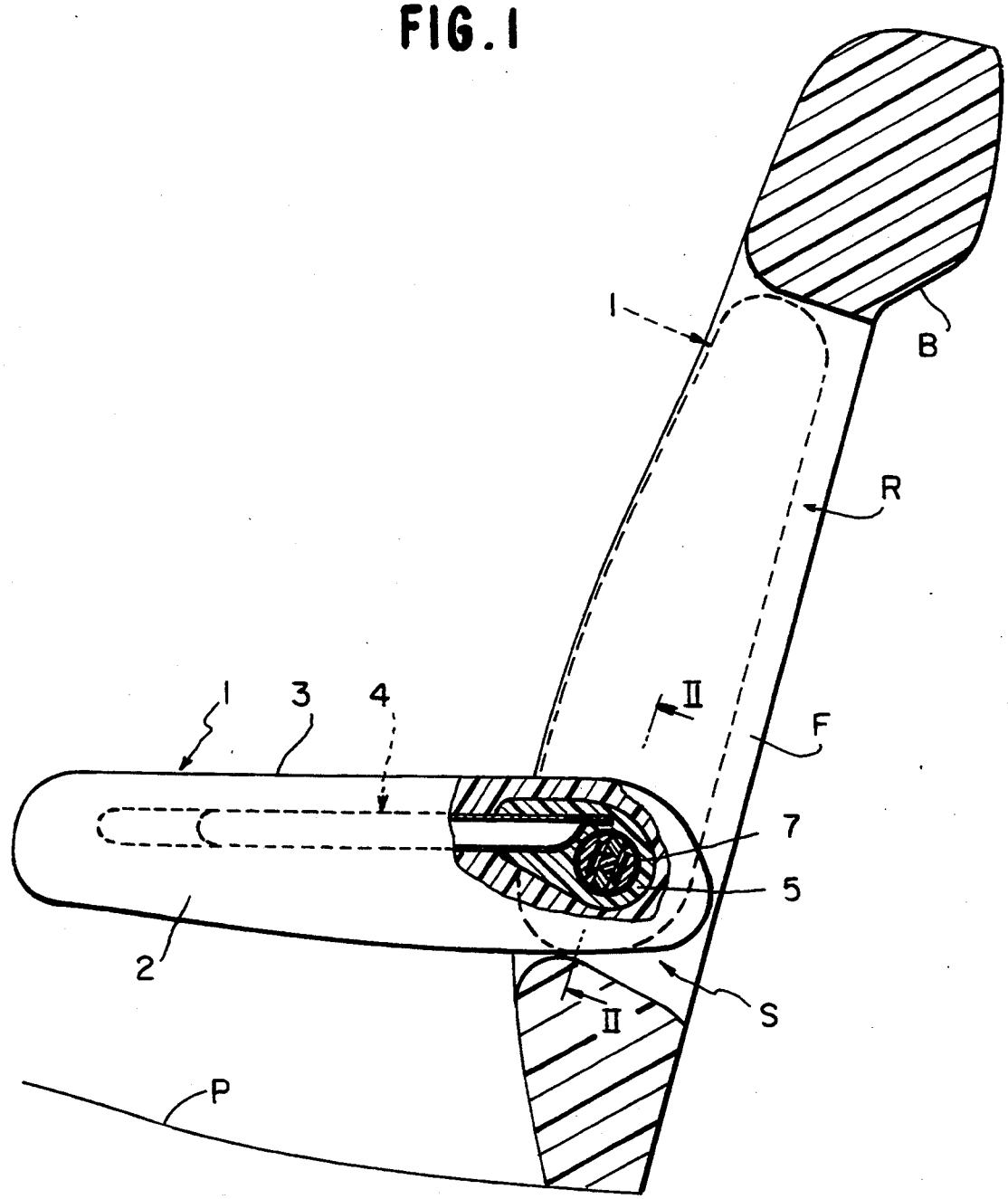
FIG. 1 is a diagrammatic and partially vertically sectioned view of an arm rest according to the invention applied to a motor vehicle rear seat.
Figure 2:
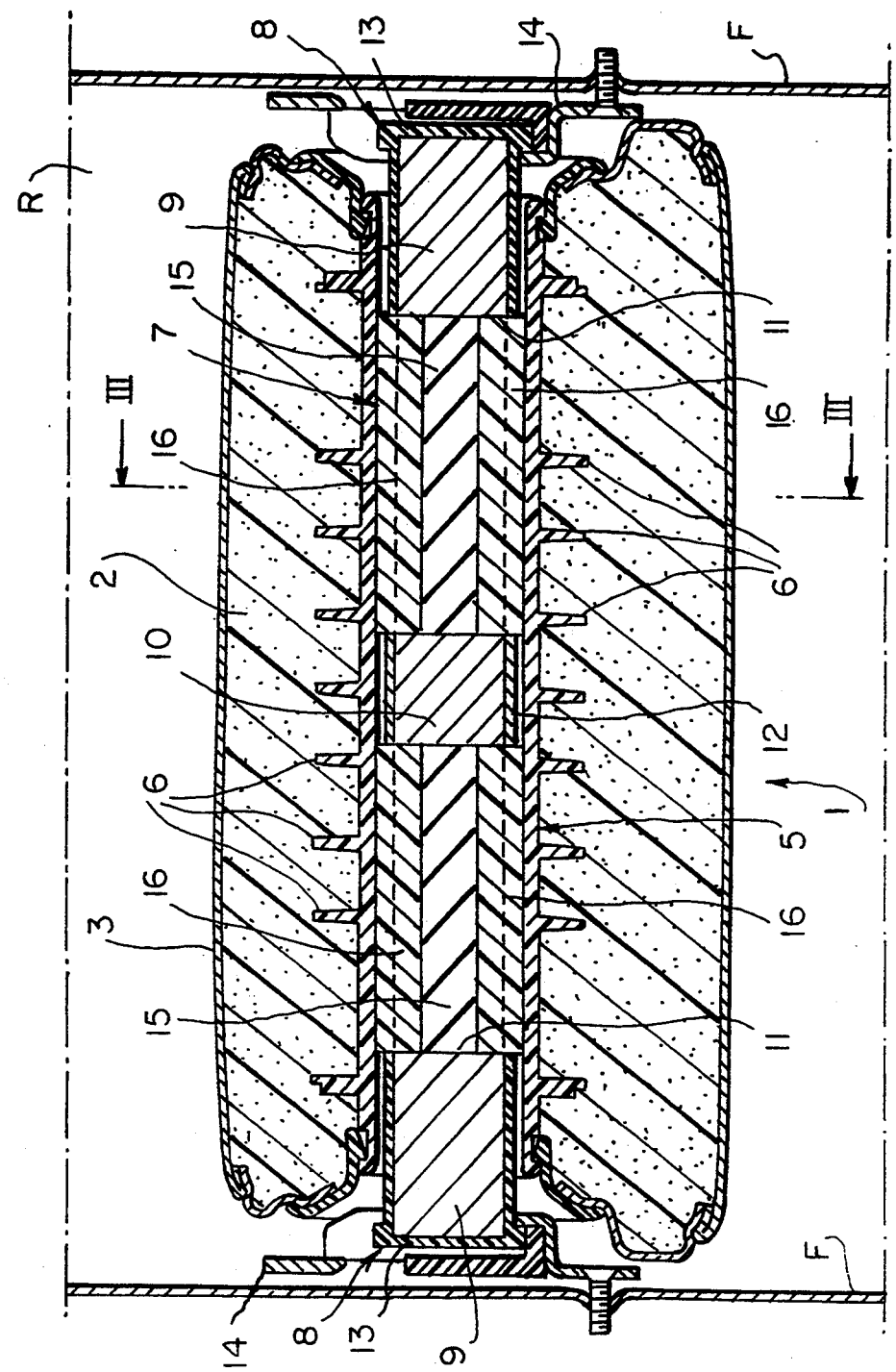
FIG. 2 is a cross sectional and enlarged view along line II—II of FIG. 1.

Referring initially to FIGS. 1 and 2, reference numeral 1 generally designates as a whole an arm rest according to the invention, particularly adapted to be applied centrally to a rear seat S of a motor vehicle including conventionally a backrest B and a seating portion or cushion P.

The central zone of the backrest B is formed with a recess R the lateral sides F of which, support, at the lower part of such recess R, the arm rest 1.

In the mounted condition the arm rest 1 is thus pivotally supported by the sides F of the recess R, in the way disclosed in detail hereinafter, between an operative lowered position shown with continuous line in FIG. 1, in which it extends substantially horizontally above the seating portion P, and an inoperative raised position, shown with dotted line in the same figure, in which it is housed within the recess R so as to provide a substantially continuous resting surface of the backrest B.

In a generally conventional way the arm rest comprises an elongated body 2, normally made of foamed plastic material with an outer covering 3, within which a load bearing structure 4 is incorporated, which is normally in part of metal and in part of moulded plastic material.

The load bearing structure 4 is formed, in correspondence of the support area of the arm rest 1 by the backrest B, with a tubular end portion 5, oriented transverse to the body 2 and provided with outer stiffening elements 6, and which is rotatably mounted on a support shaft generally indicated as 7.

Figure 3:
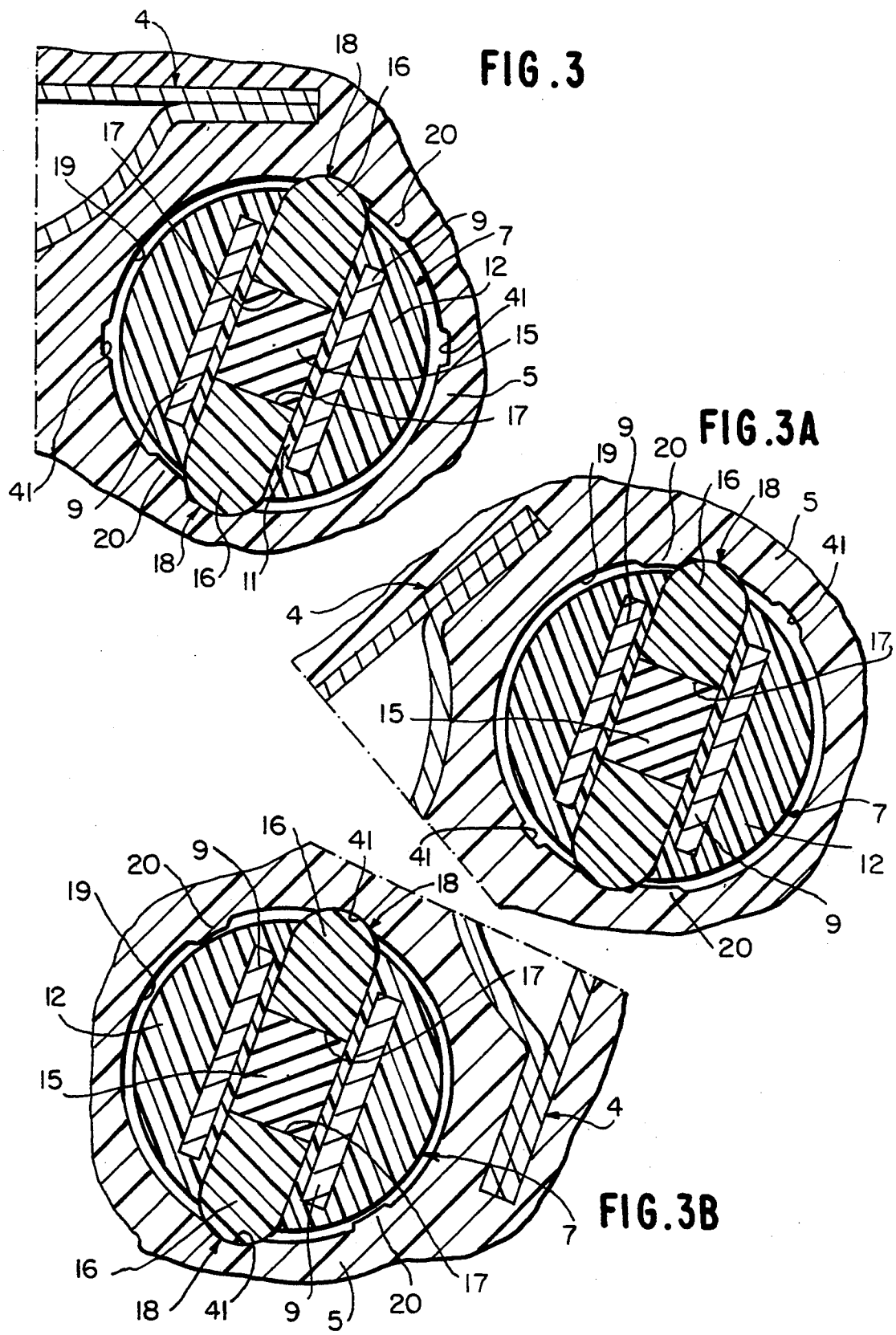
FIG. 3 is a sectional view along line III—III of FIG. 2 (or of FIG. 5)

The shaft 7 coaxially extends through the tubular end portion 5 and has its ends 8 protruding from opposite sides thereof for its connection, in a stationary condition, to the lateral sides F of recess R of the backrest B. Referring now also to FIG. 3, the shaft 7 is formed by two longitudinal metal straps 9 facing and adjacent to each other and rigidly connected (for instance by welding) in correspondence of the ends 8, as well as in correspondence of a central portion 10 of the shaft 7. The two metal straps 9 are spaced relative to each other in the intermediate zones comprised between said central portion 10 and each of the ends 8, so as to define a pair of longitudinal through cavities 11.

In the area of such cavities 11 and of the central portion 10, a plastic material body 12 is partially overmoulded on the metal straps 9. Even on the terminal portions of the metal straps 9, corresponding to the ends 8 of the shaft 7, two caps 13 are applied by overmolding, which caps engage by means of a form coupling corresponding shaped connection plates 14 rigidly fixed to the sides F of the recess R. Such a coupling is rapidly disengageable, by means of a forced displacement of the body 2 upwardly when the arm rest 1 is in the lowered position.

Each of the two cavities 11 defined by the metal straps 9 houses a respective median longitudinal member 15 of elastomeric material, having a generally quadrangular cross section of a width which is slightly less than the width of the cavity 11, on opposite sides of which two radially movable axial outer elements 16, normally made of molded plastic material, rest.

As it is shown in more details in FIG. 3, each radially movable element 16 has a flat base 17 bearing on the elastomeric member 15, and a cylindrical outer surface 18 projecting outwardly with respect to the cavity 11 and resting in pressure contact against the inner wall 19 of the tubular end portion 5. Actually, the disposition is such that the elastomeric members 15 are in a pre-compressed condition and the contact between the surfaces 18 of the radially movable element 16 and the inner wall 19 of the tubular end portion 5 generates a friction which prevents free rotation of the arm rest 1 relative to the shaft 7. Such a rotation can thus only be performed in a controlled way, by raising or lowering the body 2.

The inner wall 19 of the tubular end portion 5 is formed with respective pairs of integral positioning inner projections 20 against which the surfaces 18 of the respective radially movable elements 16 abut on opposite sides in the lowered position (FIG. 3) and in the raised position (FIG. 3B) of the arm rest 1. In the raised position of the arm rest shown in FIG. 3B the radially movable elements 16 engage respective recesses 41 also formed in the inner wall 19 of the tubular end portion 5.

Starting from the lowered position of FIG. 3, in case a load of an amount exceeding a predetermined value (for instance higher than 80 kg.) is applied onto the overhanging portion of the body 2, the compression deformation of the elastomeric members 15 allows the respective elements 16 to radially shrink of such an amount that the corresponding outer surfaces 18 are permitted to snap pass over the positioning projections 20. In such an event the body 2 of the arm rest 1 can thus perform a further lowering frictioned travel below the lowered position, until resting (if this is allowed by the conformation of the lower wall of the recess R and by the elasticity of the latter as well as that of the body 2) with its free end on the seating portion P. In this case the position of the radially movable elements 16 relative to the inner positioning projections 20 is that shown in FIG. 3A.

Figure 4:
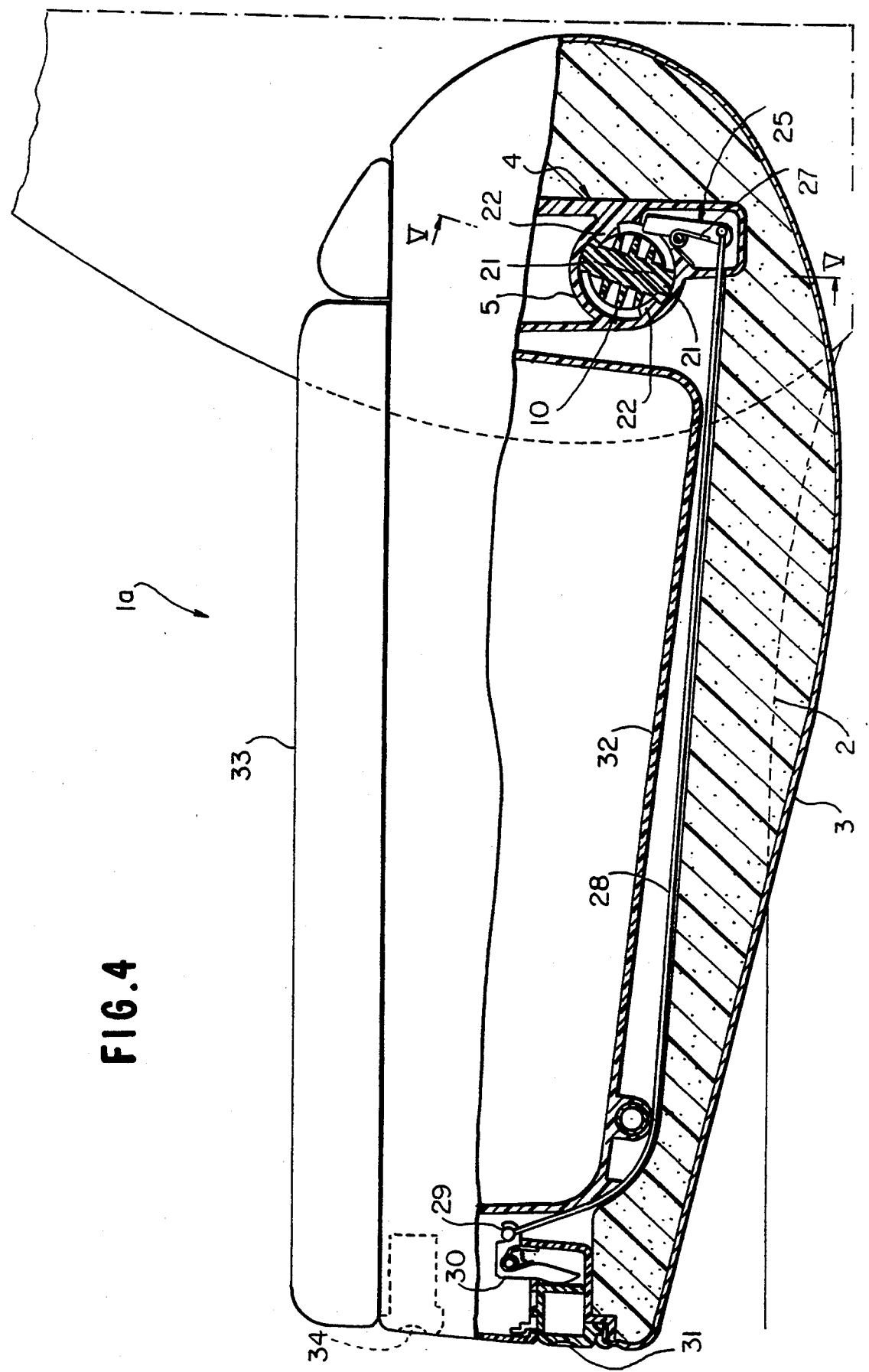
Figure 6:
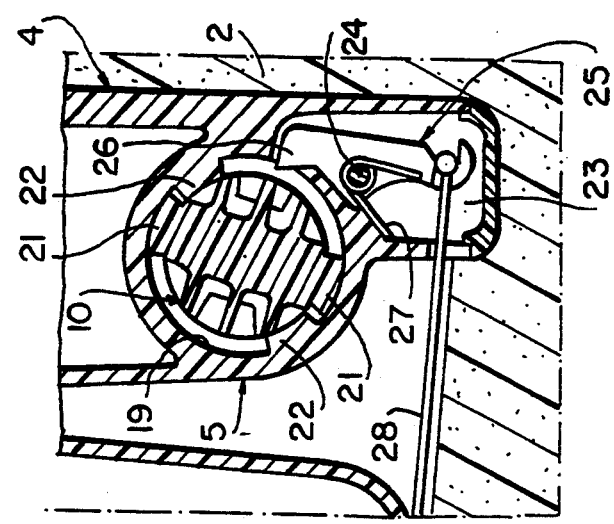
Figure 5:
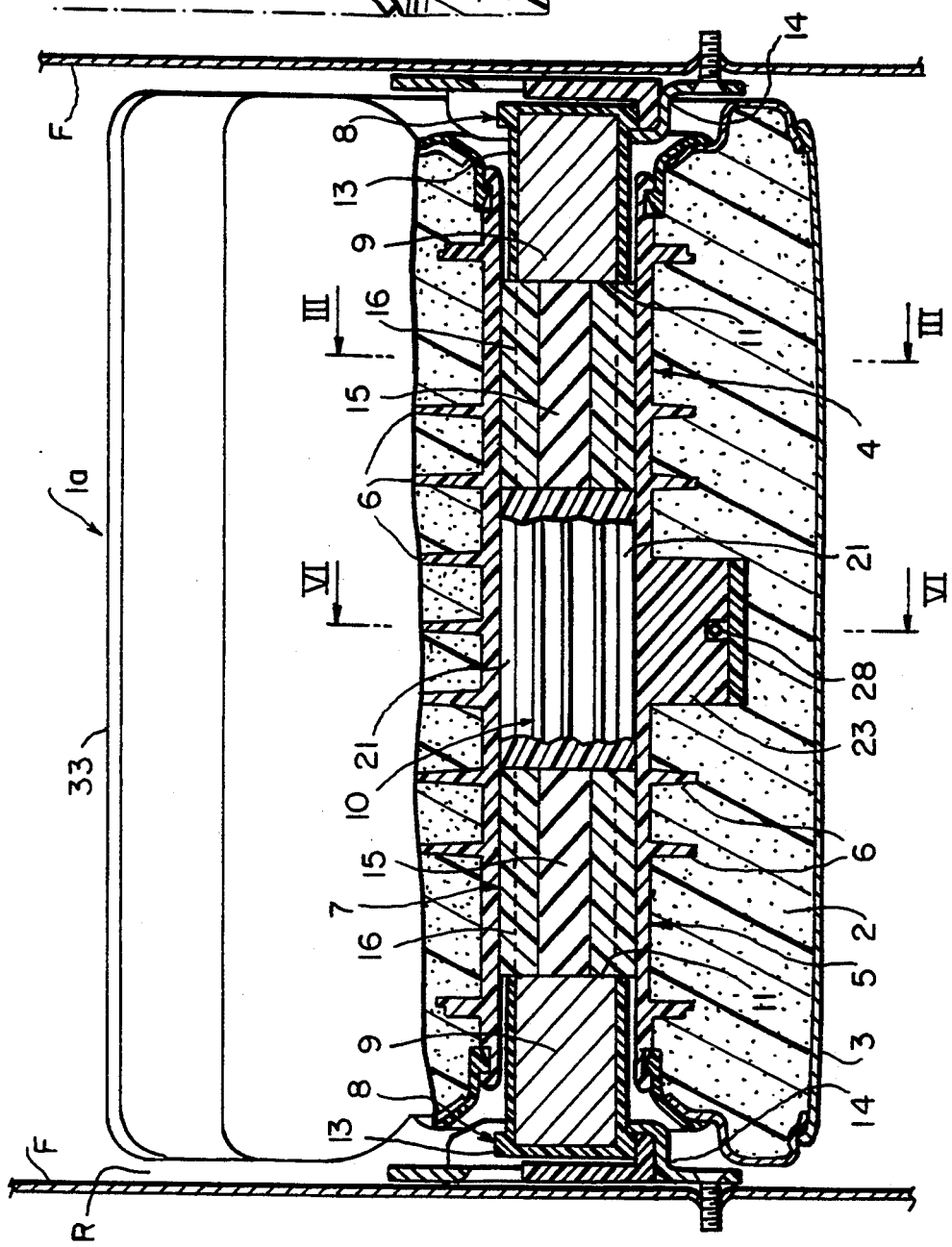

FIGS. 4 through 6 show an alternative embodiment of the arm rest according to the invention: in such figures parts identical or similar to those previously disclosed are indicated with same numeral references.

According to this alternative embodiment the arm rest, generally indicated as 1a, differs from the preceeding embodiment essentially in that it is provided with a locking device in the raised position. In this respect the central portion 10 of the shaft 7 is formed, as it is shown in FIGS. 4 and 6 (in which the metal straps 9 have been omitted for clarity of illustration) with a pair of outer stop projections 21 adapted to cooperate with a pair of corresponding inner stop projections 22 formed on the inner wall 19 of the tubular end portion 5 of the load bearing structure 4, for limiting the angular travel of the arm rest 1 between the raised and lowered positions. With the disposition shown in the drawings of the stop projections 21 and 22, the function related to the further frictioned lowering travel of the body 2 beyond the lowered position of the arm rest 1 is prevented; however, a solution on which such a function is anyhow allowed can also be contemplated.

In correspondence of the central portion 10 of the shaft 7, the tubular end portion 5 of the load bearing structure 4 is integrally formed with a hollow appendix 23 in which a disengageable retaining means is provided having a swingably mounted pawl 25, swingable around a transverse pin 24, a having an end tooth 26 maintained, under the thrust of a coil-spring 27, within the tubular end portion 5.

On the side opposite to the tooth 26, the pawl 25 is anchored to one end of a flexible cable transmission 28 extending within the body 2 and whose other end is anchored in 29 to a swinging lever 30 operable by means of a spring push button 31 placed in correspondence of the free end of the arm rest 1a.

In use, when the arm rest 1a is rotated from the lowered position shown in the drawings towards the raised position, the tooth 26 of the pawl 25 intercepts the lower stop projection 21, thus moving backward against the action of the spring 27 until passing over such a projection 21 and consequently snap locking the load bearing structure 4 relative to the stationary shaft 7. In order to move again the arm rest 1a towards the lowered position, it is then necessary to operate the push button 31 so as to move backward, by means of the flexible cable 28, the tooth 26 of the pawl 25 relative to the projection 21.

As it can be seen in FIG. 4, the general shape of the load bearing structure 4 is in this case such as to define a container 32, accessible from above through an oscillating cover 33 provided with a push button opening and closure device 34. This disposition can also be adopted in the case of the embodiment previously disclosed with reference to FIGS. 1 through 3B.

Naturally the details of construction may be widely varied with respect to what has been disclosed and illustrated, without departing from the scope of the present invention such as defined in the appended claims.

What is claimed is:

1. An arm rest for motor vehicle rear seats having a seating portion and a backrest formed with a central recess, comprising an elongated body having opposite sides and a load bearing structure incorporated within the body and including swinging mounting means for mounting the arm rest in said recess of the seat backrest, wherein said mounting means comprise a tubular end portion of the load bearing structure oriented transverse to the body and a shaft coaxially inserted through said tubular end portion and having respective ends protruding from the opposite sides of the body for connection thereof in a stationary condition to the seat backrest so as to allow rotation of said tubular end portion on said shaft between a raised position and a lowered position of the arm rest, and wherein the shaft includes rotational friction means mounting therein and cooperating with said tubular end portion of the load bearing structure and constituted by outer axial elements radially movable with respect to the shaft, and by associated elastically deformable inner members acting so as to radially urge said axial elements into pressure contact against said tubular end portion of the load bearing structure.

2. An arm rest according to claim 1, wherein said shaft is formed with a pair of cavities each of which is disposed between a respective end of the shaft and a central portion thereof, each cavity housing one of said elastically deformable inner members comprised of an elastomeric material and a pair of said radially movable elements, placed in an opposed condition on opposite sides of said inner member.

3. An arm rest for motor vehicle rear seats having a seating portion and a backrest formed with a central recess, comprising an elongated body having opposite sides and a load bearing structure incorporated within the body and including swinging mounting means of the arm rest in said recess of the seat backrest, wherein said mounting means comprise a tubular end portion of the load bearing structure oriented transverse to the body and a shaft coaxially inserted through said tubular end portion and having respective ends protruding from the opposite sides of the body for connection thereof in a stationary condition to the seat backrest so as to allow rotation of said tubular end portion on said shaft between a raised position and a lowered position of the arm rest, and wherein the shaft incorporates rotational friction means cooperating with said tubular end portion of the load bearing structure and constituted by outer axial elements radially movable with respect to the shaft, and by associated elastically deformable inner members acting so as to radially urge said axial elements into pressure contact against said tubular end portion of the load bearing structure, wherein said shaft is formed with a pair of cavities each of which is disposed between a respective end of the shaft and a central portion thereof, each cavity housing one of said elastically deformable inner members comprised of an elastomeric material and a pair of said radially movable elements, placed in an opposed condition on opposite sides of said inner member; and wherein said shaft is constituted by a pair of longitudinal metal straps facing each other and rigidly connected to each other adjacent the ends and said central portion of the shaft, and spaced apart from each other adjacent said cavities.

4. An arm rest according to claim 3, wherein the said shaft further comprises a plastic material body overmoulded on the said metal straps.

5. An arm rest according to claim 1 wherein the said tubular end portion of the load bearing structure is formed with inner positioning projections against which the said radially movable elements of the shaft abut at least in the said lowered position of the arm rest, and wherein the said arm rest is susceptible to perform a further frictioned lowering travel beyond the said lowered position, in case a load of an amount higher than a predetermined value is applied thereon, due to passing over of the said inner positioning projections by the said radially movable elements against the action of the said elastically deformable members.

6. An arm rest according to claim 1 wherein a central portion of the shaft and said tubular end portion of the load bearing structure are provided with respectively outer and inner complementary stop projections for limiting the angular travel of the arm rest between said raised and lowered positions.

7. An arm rest according to claim 6, further comprising disengageable retaining means cooperating with at least one of said outer stop projections of the shaft for locking the arm rest in the raised position.

8. An arm rest according to claim 7, wherein the said disengageable retaining means comprise a swingable pawl supported by the load bearing structure of the arm rest and snap engageable behind one of said outer stop projections of the shaft following rotation of the arm rest to the raised position, and a flexible cable transmission having an operating push button for disengaging said pawl relative to said outer stop projection.

9. An arm rest according to claim 1, further comprising a pair of connecting elements adapted to be fixed to the seat backrest and in which said ends of the shaft projecting from the body of the arm rest are disengageably fitted.

* * * * *